United States Patent [19]
Javidi et al.

[11] Patent Number: 5,841,907
[45] Date of Patent: Nov. 24, 1998

[54] SPATIAL INTEGRATING OPTICAL CORRELATOR FOR VERIFYING THE AUTHENTICITY OF A PERSON, PRODUCT OR THING

[75] Inventors: Bahram Javidi, Storrs, Conn.; Fai Mok, Torrance; Demetri Psaltis, Pasadena, both of Calif.

[73] Assignee: The University of Connecticut, Storrs, Conn.

[21] Appl. No.: 890,380

[22] Filed: Jul. 11, 1997

Related U.S. Application Data

[63] Continuation of Ser. No. 339,987, Nov. 14, 1994, abandoned.

[51] Int. Cl.⁶ .............................. G06K 9/76; G02B 27/46
[52] U.S. Cl. ........................ 382/210; 382/278; 359/561
[58] Field of Search ................................. 382/278, 280, 382/210, 212, 218, 115; 359/29, 559, 560, 561; 372/26, 27

[56] References Cited

U.S. PATENT DOCUMENTS

| | | | |
|---|---|---|---|
| 3,716,301 | 2/1973 | Caulfield | 356/165 |
| 3,995,948 | 12/1976 | Abe et al. | 350/3.5 |
| 4,588,260 | 5/1986 | Horner | 350/162.13 |
| 4,706,296 | 11/1987 | Pedotti et al. | 382/278 |
| 4,765,714 | 8/1988 | Horner et al. | 350/162.13 |
| 4,826,285 | 5/1989 | Horner | 350/162.1 |
| 4,832,447 | 5/1989 | Javidi | 350/162.1 |
| 4,948,258 | 8/1990 | Caimi | 356/376 |
| 5,040,140 | 8/1991 | Horner | 351/561 |
| 5,214,716 | 5/1993 | Refregier et al. | 382/278 |
| 5,251,222 | 10/1993 | Hester et al. | 372/26 |
| 5,309,523 | 5/1994 | Iwaki et al. | 382/42 |
| 5,485,312 | 1/1996 | Horner et al. | 359/361 |

Primary Examiner—Jose L. Couso
Assistant Examiner—Matthew C. Bella
Attorney, Agent, or Firm—Fishman, Dionne, Cantor & Colburn

[57] ABSTRACT

A method of verifying the authenticity of an object is disclosed employing a spatial integrating optical correlator. An unreadable and hence non-counterfeitable mask (e.g., a complex mask or a phase mask) is coupled to the object and the optical correlator compares the mask with a reference mask on which it is scanned over. The correlator produces a correlation spot or image having an intensity which exceeds a given level if the mask is genuine. An alternate embodiment includes a fingerprint or other personalized pattern bonded to the mask, and the fingerprint or other personalized pattern on the card is compared to a reference fingerprint or other personalized pattern of the card holder for added security.

93 Claims, 5 Drawing Sheets

FIG. 4C SHIFT IN Y DIRECTION: 3 PIXELS

FIG. 4G SHIFT IN Y DIRECTION: 7 PIXELS

FIG. 4B SHIFT IN Y DIRECTION: 2 PIXELS

FIG. 4F SHIFT IN Y DIRECTION: 6 PIXELS

FIG. 4A SHIFT IN Y DIRECTION: 1 PIXEL

FIG. 4E SHIFT IN Y DIRECTION: 5 PIXELS

FIG. 3 SHIFT IN Y DIRECTION: 0 PIXELS

FIG. 4D SHIFT IN Y DIRECTION: 4 PIXELS

SPATIAL INTEGRATING OPTICAL CORRELATOR FOR VERIFYING THE AUTHENTICITY OF A PERSON, PRODUCT OR THING

This is a continuation of application Ser. No. 08/339,987 filed on Nov. 14, 1994, now abandoned.

BACKGROUND OF THE INVENTION

Credit card fraud is a serious problem facing many banks, businesses and consumers. This aims at securing credit cards, passports, high security IDs, and other IDs so that they cannot be reproduced. In addition, counterfeit parts such as computer chips, machine tools, etc. are arriving on our shores in great numbers. With the rapid advances in computers, CCD technology, image processing hardware and software, printers, scanners, and copiers, it is becoming very easy to reproduce pictures, logos, symbols, money bills, holograms or patterns. By way of example, a holographic pattern can be easily acquired from a credit card (photographed or captured by a CCD camera) and then a new hologram synthesized by a computer. It can then be written onto an optical film or etched onto a surface to generate the holographic image. Therefore, any pattern that can be read by a conventional light source and a CCD camera can be easily reproduced.

This problem has been recently addressed in U.S. patent application Ser. No. 08/127,651 ('651) filed Sep. 14, 1993 entitled Optical Pattern Recognition System For Verifying The Authenticity Of A Person, Product Or Thing. Also see an article entitled "Optical pattern recognition for validation and security verification", by B. Javidi and J. L. Homer, Opt. Eng. vol. 33 no. 6, Jun. 1994. The '651 application discloses that invisible patterns that cannot be seen and cannot be copied by a detector such as the CCD camera are utilized for verification of the authenticity of items bearing the pattern. The pattern consists of a two dimensional phase mask with up to several millions of pixels or higher. The large dimensions of the mask make it extremely difficult (if not impossible) to guess the contents of the mask. The nature of this mask is known only to the authorized producer of the card. The phase nature of the mask makes it invisible to any conventional intensity detector such as a CCD camera or the human eye. For example, one cannot analyze the mask by looking at the card under a microscope or photographing it, or reading it with a computer scanner in an attempt to reproduce it. The phase mask can be used alone. For example, it can be affixed to a product and read by Fourier transform correlators or processors to verify authenticity. Or the mask can be bonded to another image such as a fingerprint or a picture of a person, and used on an ID or credit card. It can not be removed without destroying the phase mask and/or the underlying image, which destruction can be verified visually. The phase mask and an image of a corresponding reference phase mask are illuminated by coherent light in the input plane of a frequency plane correlator or a joint transform correlator. The joint power spectrum of the two images is inverse Fourier transformed to produce a correlation spot. If the phase mask is genuine, the intensity of the correlation spot will exceed a predetermined intensity level to produce a verification output signal.

However, the device of the '651 application requires exact alignment, extensive memory, sophisticated electronics, and expensive optical components, resulting in a relatively expensive device. In light of the industries likely to employ such devices, i.e., retail/merchandising, banking and the like, the cost for this additional security is a significant factor.

SUMMARY OF THE INVENTION

The above discussed and other drawbacks and deficiencies of the prior art are overcome or alleviated by the spatial integrating optical pattern recognition system for verifying the authenticity of a person, product or thing of the present invention. In accordance with a method of the present invention, a card (or any other object whose authenticity is to be verified) has an input mask, having a one (or two) dimensional random function, affixed thereto. The card may be a credit card, debit card, identification card, bank card, key card or any other card where additional security is desired. A light source generates a partially coherent light beam for illuminating the input mask by reflection or by transmitting the light beam through a portion of the card, when the card is disposed within the light path. A reference mask, with a one (or two) dimensional function similar to the one on the card (i.e., the input mask), is positioned within the path of an image projected by the illumination of the input mask on the card. The product of the reference mask and the input mask impinges a lens which generates at its Fourier plane the spatial correlation between the two functions which is recorded by a detector positioned at the optical axis of a Fourier plane intersecting the optical axis of the system for measurement of the correlated signal. A number of techniques can be used to image the input mask on the reference mask (e.g., see "Introduction to Fourier Optics", by J. W. Goodman, McGraw-Hill, 1968; "Fundamentals of Photonics", by B. E. A. Saleh and M. Teich, Wiley, 1991; and "Optical Signal Processing", by J. L. Homer, Academic Press, 1987, all of which are incorporated herein by reference).

If a more complex correlation is desired, such as detecting a mask in the presence of noise or other distortions, the mask may be convolved with an impulse response of a system that is designed to detect a reference mask in the presence of noise or other distortions. In any case, the input (or reference) mask is slided over the reference (or input) mask to generate the correlation by spatial integration.

A pattern (e.g., a biometric pattern such as a fingerprint) could be amplitude and/or phase encoded and overlayed on the input mask on the card which together form a composite mask. The pattern having a function, e.g, a photograph of a face or a fingerprint. A two dimensional (2-D) correlation by a one dimensional (1-D) integration along the x-direction is presented. In accordance with which, a composite mask which includes replications of the reference mask along the opposite integration coordinate, in the y-direction, is employed. This allows tolerance to misalignments of the mask during the spatial correlation.

The codes in the optical correlator can be updated if a spatial light modulator is used to display the reference mask, see generally, "Special issue on materials and devices for optical information processing", by, C. Warde, and U. Efron, Opt. Eng. 25, 197, 1986; "Spatial Light Modulators: Applications and Fundamental Capabilities, in Optical Signal Processing", by Warde, and Fisher, J. Horner, Editor, Academic, 1987; "Low-cost LCD video display for optical processing", by M. Young, Appl. Opt. 25, 1024, 1986; "Application of the Liquid Crystal Light Valve to Real-Time Optical Data Processing", by W. P. Bleha, et al, Opt. Eng. 17, 371–384, 1978; and "Photorefractive incoherent-to-coherent optical converter", by Y. Shi, D. Psaltis, A. Marrakchi and A. R. Tanguay, Jr., Appl. Opt. 22, 3665–3667, 1983, all of which are incorporated herein by reference.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF THE INVENTION

Figure 1:
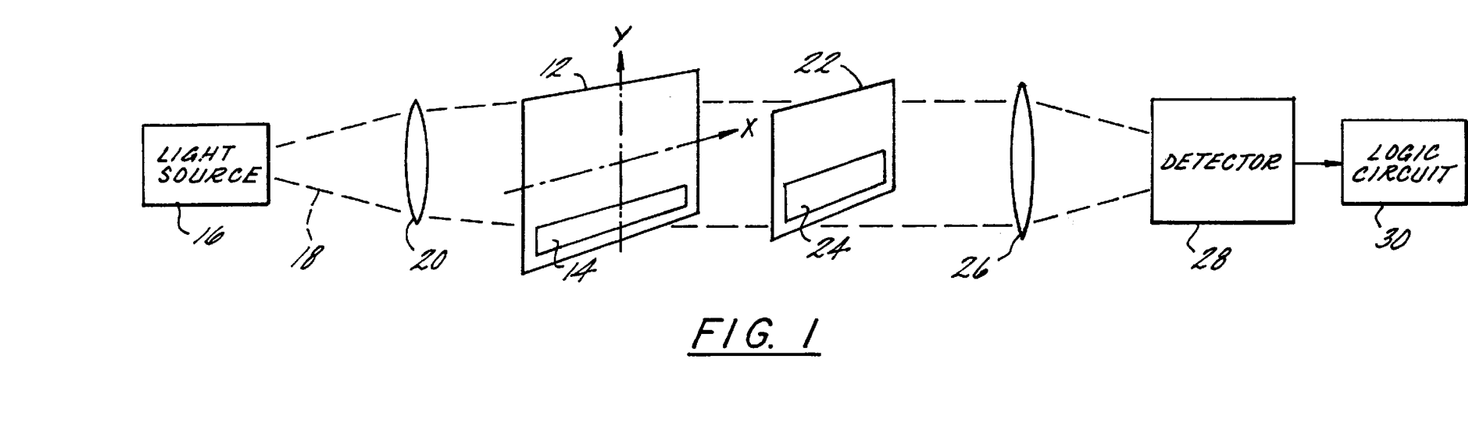
FIG. 1 is a diagrammatic view of an optical pattern recognition system in accordance with a first embodiment of the present invention.

Referring to FIG. 1, a card 12 (or any other object whose authenticity is to be verified) has an input mask 14, having a one dimensional random function N(x), affixed thereto. Card 12 may be a credit card, debit card, identification card, bank card, key card or any other card where additional security is desired. An intensity sensitive detector will not be able to read this phase-encoded pattern. This input mask can be sandwiched between two layers of durable transparent optical films which are filled with a liquid to compensate for the phase non-uniformities of the optical materials, that is, a so-called liquid gate. Such methods of making the mask are known and are described in U.S. Pat. No. 4,588,260; 4,765,714; and 4,588,260 all to Homer et al, each of which is incorporated herein by reference in its entirety. A variety of other techniques can be used to synthesize the phase mask. The mask can be fabricated by embossing thin materials, which can be multilayered, and are called pure phase material, such material being marketed by Polaroid and DuPont. Techniques such as those used to make refractive/binary optical elements can also be employed. These techniques can also be combined to make the mask.

A light source 16 (e.g., a laser diode) generates a generally coherent light beam 18 which is expanded by a lens 20 for illuminating input mask 14 by transmitting the light beam through a transparent portion of card 12 (or by reflection), when the card is disposed within the light path (i.e., beam 18). A reference mask 24, with a one dimensional function M(x), is positioned within the path of an image projected by the illumination of the input mask 14.

The light leaving the reference mask 24 is the product of the input and reference marks and impinges a lens 26 which generates in the Fourier plane the spatial correlation between N(x) and M(x) to produce a correlation at the input plane of a detector (e.g., CCD image sensor) 28. Detector 28 is positioned at the optical axis of a Fourier plane intersecting the optical axis of the system for measurement of the correlated signal. A variety of techniques can be used to image the input mask on the reference mask (e.g., see "Introduction to Fourier Optics", by J. W. Goodman, McGraw-Hill, 1968; "Fundamentals of Photonics", by B. E. A. Saleh and M. Teich, Wiley, 1991; and "Optical Signal Processing", by J. L. Homer, Academic Press, 1987, all of which are incorporated herein by reference).

It is preferred in this embodiment that one dimensional complex phase/amplitude patterns are utilized for verification of the authenticity of items bearing the pattern. However, one dimensional phase patterns may also be utilized for verification of the authenticity of items bearing the pattern. Scanning input mask 14 with function N(x) over reference mask 24 with function M(x) in the x-direction, i.e., one dimensional scanning, results in:

$$R(x)=\int M(x-x')N(x')dx'$$

where R(x) is the correlation between the two masks functions N(x) and M(x).

If a more complex correlation is desired, such as detecting input mask 14 with function N(x) in the presence of noise or other distortions, mask 14 with function N(x) may be convolved with an impulse response h(x) of a system that is designed to detect a mask having a function M(x) in the presence of noise or other distortions. In this case, reference mask 24 has a function of the impulse response h(x) which is scanned over mask 14 with function N(x), whereby, $$R(x)=\int h(x-x')N(x')dx'$$

When the degree of correlation between N(x) and M(x) (or h(x)) is high, a high intensity spot (i.e., a Dirac delta function) will be detected by detector 28 and if the intensity thereof exceeds a predetermined level, a logic circuit 30 by comparing this correlated signal with the threshold will produce an authenticity verification signal at its output. If input mask 14 is a counterfeit, the intensity of the correlation spot will be far below the threshold and logic circuit 30 will not produce an authenticity verification signal. The input mask or the reference mask is preferably made to be long in the y-direction so that the critical alignment problem is eliminated.

Figure 2:
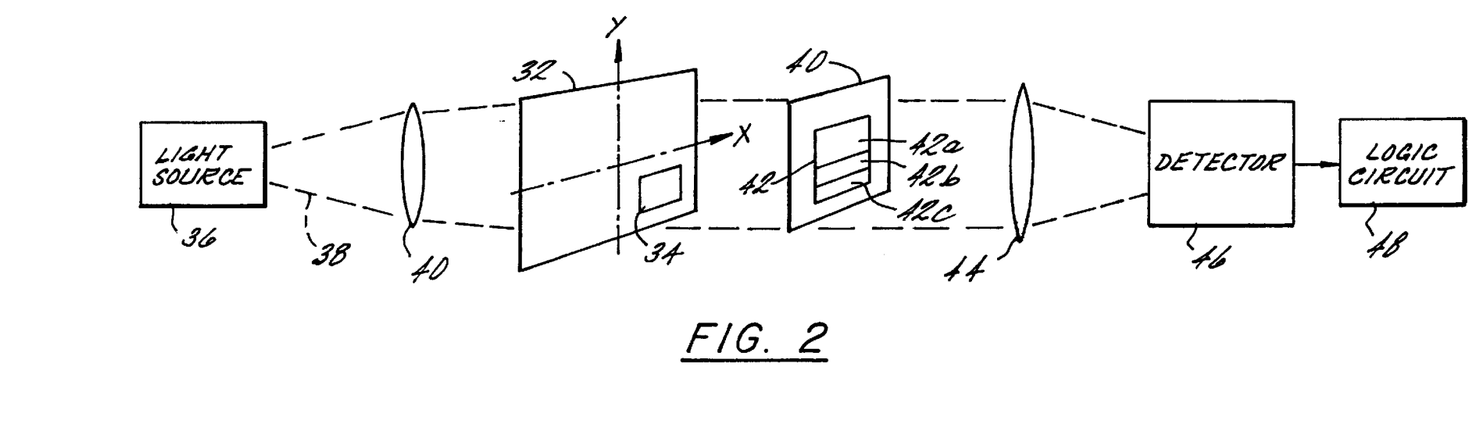
FIG. 2 is a diagrammatic view of an optical pattern recognition system in accordance with a second embodiment of the present invention.

In accordance with another embodiment of the present invention, a card 32 has an input mask 34, having a two dimensional random function N(x,y), affixed thereto. Card 32 is, for example, the same type of card as is described hereinabove with regard to card 12. A light source 36 (e.g., a laser diode) generates a generally coherent light beam 38 which is expanded by a lens 40 for illuminating the input mask 34 by transmitting the light beam through a transparent portion of card 32 (or by reflection), when the card is disposed within the light path (i.e., beam 38). A reference mask 42, with a two dimensional function M(x,y), is positioned within the path of an image projected by the illumination of the input mask 34. Reference mask 42 is preferably comprised of a pattern of overlapping phase masks, e.g., masks 42a–c as is shown in FIG. 2. This overlapping pattern allows for correction of shifts in the y-direction, as will be discussed below.

The light leaving the reference mask 42 is the product of the input and reference masks and impinges a lens 44 which generates in the Fourier plane the spatial correlation between N(x,y) and M(x,y) to produce a correlation spot (or image) at the input plane of a detector (e.g., CCD image sensor) 46. Detector 46 is positioned at the optical axis of the Fourier plane for measurement of the correlated signal. When the degree of correlation between N(x,y) and M(x,y) is high, a high intensity spot (i.e., a Dirac delta function) will be detected by detector 46 and if the intensity thereof exceeds a predetermined level, a logic circuit 48 by comparing this correlated signal with the threshold will produce an authenticity verification signal at its output. If input mask 34 is a counterfeit, the intensity of the correlation spot will be far below the threshold and logic circuit 48 will not produce an authenticity verification signal.

It is preferred in this embodiment that two dimensional complex phase/amplitude patterns are utilized for verification of the authenticity of items bearing the pattern. However, two dimensional phase patterns may also be utilized for verification of the authenticity of items bearing the pattern. Scanning input mask 34 with function N(x,y) over reference mask 42 with function M(x,y) in the x-direction, i.e., one dimensional scanning, results in:

$$R(x,y) = \iint N(x-x', y-y') M(x',y') dx'dy'$$

where R(x,y) is the correlation between the two masks functions N(x,y) and M(x,y).

However, since alignment in the y-direction is a significant concern, the two dimensional complex phase/amplitude patterns developed below are preferred for verification of the authenticity of items bearing the pattern.

In the case of perfect alignment in the y-direction the correlation function is:

$$\hat{R}(x) = \iint N(x-x', y-y') M(x'y') dx'dy' = R(x,0)$$

Figure 3:
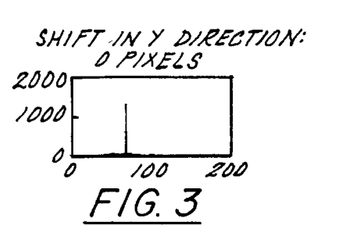
FIG. 3 is a graph of a correlation function in accordance with the present invention.
Figure 4A:
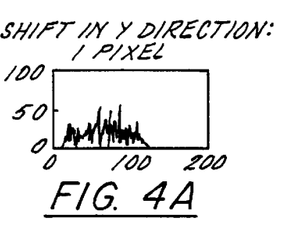
FIGS. 4A–G are graphs showing a correlation function for y-direction pixels shifts in accordance with the present invention.
Figure 4B:
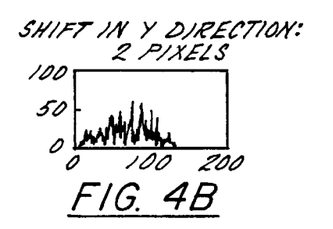
Figure 4C:
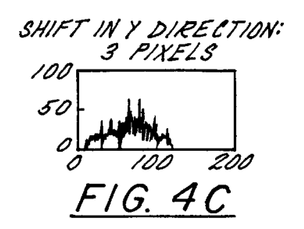
Figure 4D:
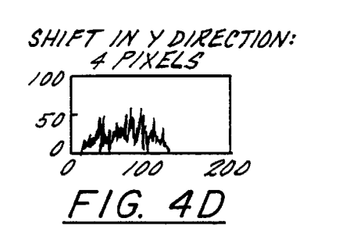
Figure 4E:
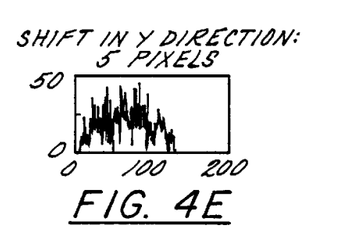
Figure 4F:
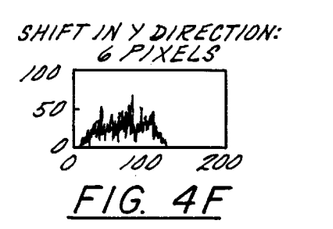
Figure 4G:
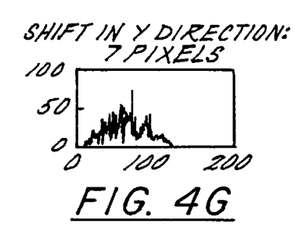

Therefore, when N=M, there is an auto correlation peak at x=0, resulting in a correlation output shown in FIG. 3, whereby:

$$\hat{R}(0) = \iint |M(x',y')|^2 dx'dy'$$

In the case of misalignment in the y-direction the correlation is:

$$\hat{R}(x) = \iint N(x-x', y-y'_0) M(x',y') dx'dy' = R(x,y_0)$$

where $y_0$ is the number of pixel misalignment in the y-direction. Therefore, when N=M, there is no auto-correlation peak at x=0, resulting in the correlation outputs shown in FIGS. 4A–G.

To correct for a misalignment problem in the y-direction, the reference mask 42 having function $M_{SDF}$ which includes possible shifts in the y-direction is employed. A variety of techniques can be used to synthesize the $M_{SDF}$ such as those used to design synthetic discriminate functions (e.g., such as described in "Real-time Optical Information Processing", by B. Javidi and J. L. Horner, Academic Press, 1994; and "Optical Pattern Recognition", by B. Javidi and Ph. Refregier, Optical Engineering Press, June 1994, both of which are incorporated herein by reference. The $M_{SDF}$ function can be defined by:

$$M_{SDF}(x, y) = \sum_{i=1}^{m_o} M(x, y - i) \quad m_o > y_o$$

where $m_0$ is the maximum pixels of input mask 34 shifts in the y-direction. Therefore, substituting $M_{SDF}$ results in a correlation function of:

$$\hat{R}(x) = \iint N(x-x', y-y_0) M_{SDF}(x,y) dx dy$$

Further, $$\hat{R}^{(x)} = \iint N(x - x', y - y_o) M(x, y - y_o) dx dy +$$

$$\iint N(x - x', y - y_o) \sum_{\substack{i=1 \\ i \neq y_o}}^{m_o} M(x, y - i) dx'dy'$$

Lastly, $$\hat{R}^{(x)} = R(x, o) + \sum_{\substack{i=1 \\ i \neq y_o}}^{m_o} R(x, y_o - i)$$

Therefore, where N=M, the output signal at x=0 comprises (1) auto-correlation R(0,0) and (2) cross-correlations $$\sum_{\substack{i=1 \\ i \neq y_o}}^{m_o} R(0, y_o - i)$$

Figure 5:
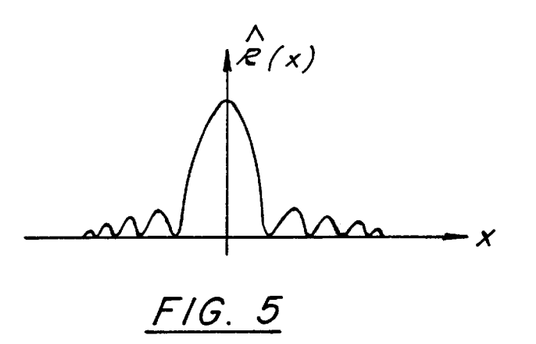
FIG. 5 is a graph of a correlation function in accordance with the present invention.
Figure 6A:
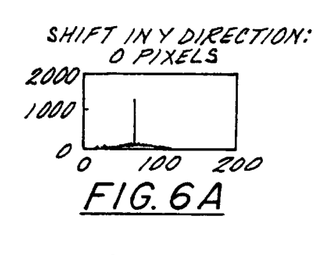
FIGS. 6A–H are graphs showing a correlation function for y-direction pixels shifts in accordance with the present invention.
Figure 6B:
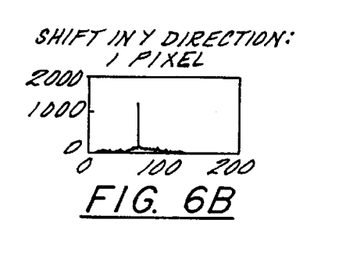
Figure 6C:
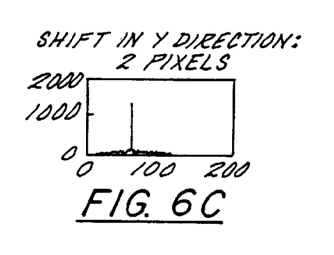
Figure 6D:
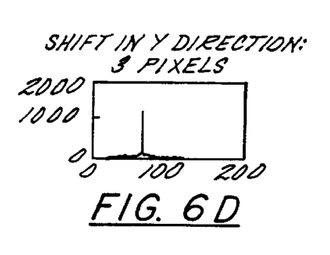
Figure 6E:
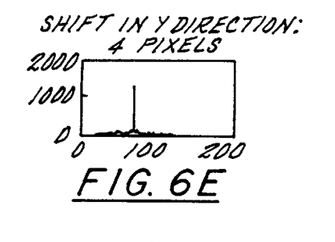
Figure 6F:
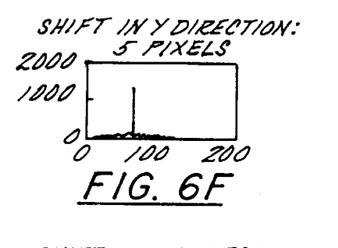
Figure 6G:
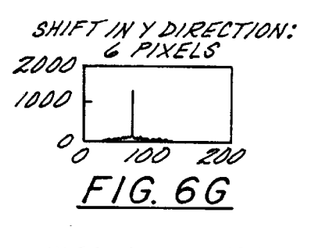
Figure 6H:
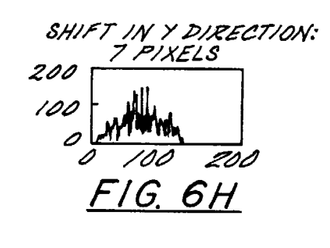
Figures 7A, 7E:
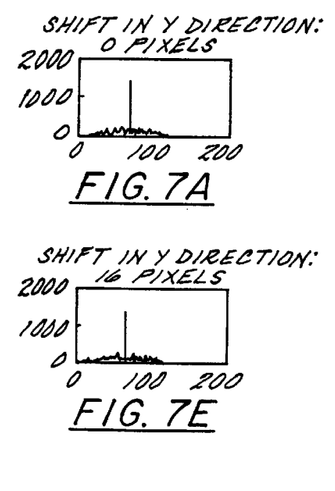
FIGS. 7A–H are graphs showing a correlation function for y-direction pixels shifts in accordance with the present invention.
Figures 7B, 7F:
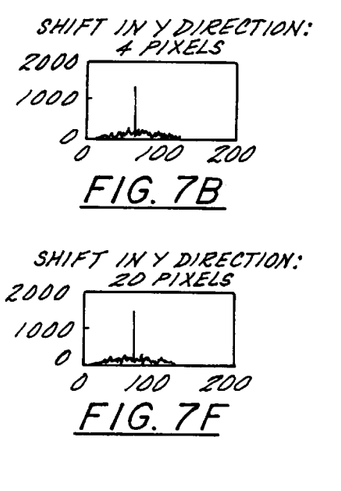
Figures 7C, 7G:
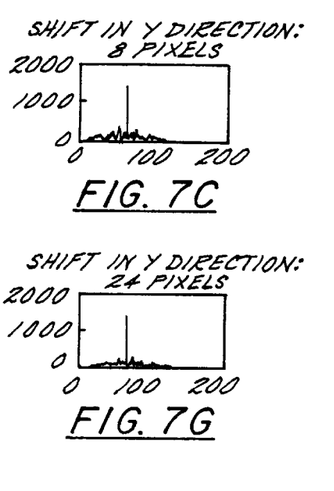
Figures 7D, 7H:
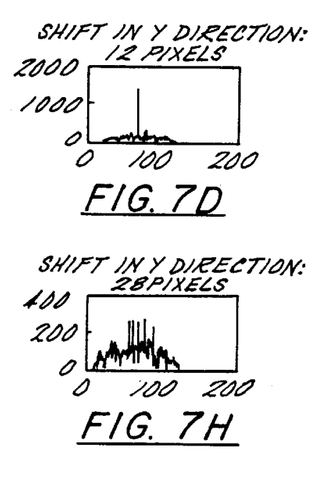

If auto-correlation R (0,0) is much larger than cross correlation term R(x, $y_0$-i) (x≠0, $y_0$-i≠0) then the result shown in FIG. 5 is obtained.

FIGS. 6A–H show correlation output for misalignment in the y-direction when $m_0$=6.

FIGS. 7A–H show correlation output for misalignment in the y-direction when $m_0$=27.

Accordingly, a reference mask having a $M_{SDF}$ function mask resolves the problem of misalignment in y-direction. Further, if the shift in y-direction is considered a type of distortion, then the $M_{SDF}$ mask results in a distortion invariant system. A variety of techniques such as those used in the design of distortion invariant filters for pattern recognition can be used to design the mask, see "Optical Signal Processing", by J. L. Homer, Academic Press, 1987 and "Real-time Optical Information Processing" By B. Javidi and J. L. Homer, Academic Press, 1994, both of which are incorporated herein by reference.

A pattern (e.g., a biometric pattern) could be phase and/or amplitude encoded and overlayed on the input mask on the card which together form a composite mask. The input mask having a random function M(x,y) which may be defined as:

$$M(x,y) = e^{i\phi_m(x,y)}$$

where $\phi_m(x,y)$ is a random signal uniformly distributed over (0, 2π). The pattern having a function f(x,y), e.g, a photograph of a face or a fingerprint. Accordingly, the composite mask has a function g(x,y)=f(x,y) M(x,y). The reference mask has a function M*(x,y). Therefore, the correlation function R(x,y) is:

$$R(x,y) = \iint M^*(x-x', y-y') g(x,y) dx dy$$

Figure 8:
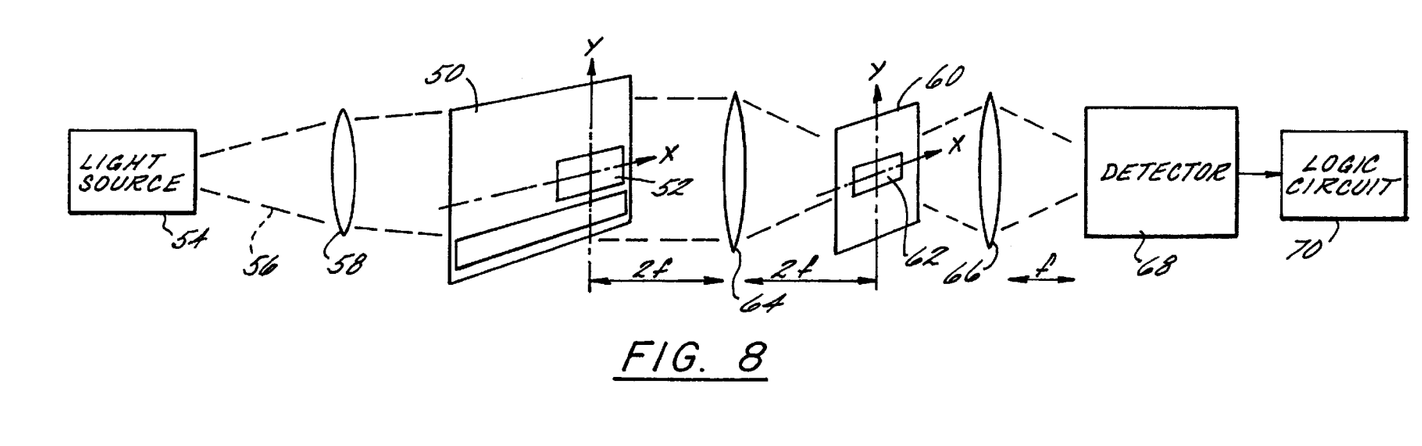
FIG. 8 is a diagrammatic view of an optical pattern recognition system in accordance with a third embodiment of the present invention.

Referring to FIG. 8, an alternate embodiment of the embodiment shown in FIG. 2 is shown. It will be appreciated that such also applies to masks having one dimensional functions, such as described above with regard to FIG. 1. A card 50 has an input mask 52, having a two dimensional random function N(x,y), affixed thereto. A light source 54 (e.g., a laser diode) generates a generally coherent light beam 56 which is expanded by a lens 58 for illuminating input mask 52 by transmitting the light beam through a transparent portion of card 50 (or by reflection), when the card is disposed within the light path (i.e., beam 58). A reference mask 62, with a two dimensional function M*(x, y), herein * is complex conjugation, is positioned in the image plane of the lens, as is well known in the art. The image of input mask 52 is multiplied with the reference mark 62 by lens 64. Lens 66 produces in its Fourier plane a correlation spot at the input plane of a detector 68.

When the degree of correlation between N(x,y) and M(x,y) is high, a high intensity spot (i.e., a Dirac delta function) will be detected by detector 68 and if the intensity thereof exceeds a predetermined level, a logic circuit 70 by comparing this correlated signal with the threshold will produce an authenticity verification signal at its output. If the input mask 52 is a counterfeit, the intensity of the correlation spot will be far below the threshold and logic circuit 70 will not produce an authenticity verification signal. The nature of this spatial integrating correlator is well know in the art, e.g., see "Introduction to Fourier Optics", by J. W. Goodman, McGraw-Hill, 1968 and "Optical Signal Processing" by J. L. Homer, Academic Press, 1987, both of which are incorporated herein by reference.

It is preferred in this embodiment that two dimensional complex phase/amplitude patterns are utilized for verification of the authenticity of items bearing the pattern. However, two dimensional phase patterns may also be utilized for verification of the authenticity of items bearing the pattern.

Further, as card 50 slides along the x axis, shifted versions of N(x,y) are multiplied by M(x,y) and the resultant transmission is integrated by lens 66 and collected by detector 68, whereby the resulting correlation is:

$$R(v,t)=\iint N(vt+x,y)M(x,y)dxdy$$

where t is time and v is velocity of sliding, whereby R(v,t) is a time varying signal. It will be appreciated that the fixed reference mask could be replaced with a spatial light modulator (SLM), as is known. Further, the distance between mask 62 and lens 66 may vary providing that lens 66 can collect all of the light transmitted, since the purpose of lens 66 is to focus the transmitted light. The distance between lens 66 and detector 68 may vary providing detector 68 is allowed to collect all of the transmitted light.

Reference mask 62 is fixed and therefore is not easily interchanged, which may pose a problem with credit cards where each company may require a different pattern for the reference mask. This problem could be overcome by mounting different reference mask on a motion stage. However, such a solution may be undesirable since it will require multiple slidings of the card (i.e., one sliding per correlation) to achieve verification and would be costly.

Figure 9:
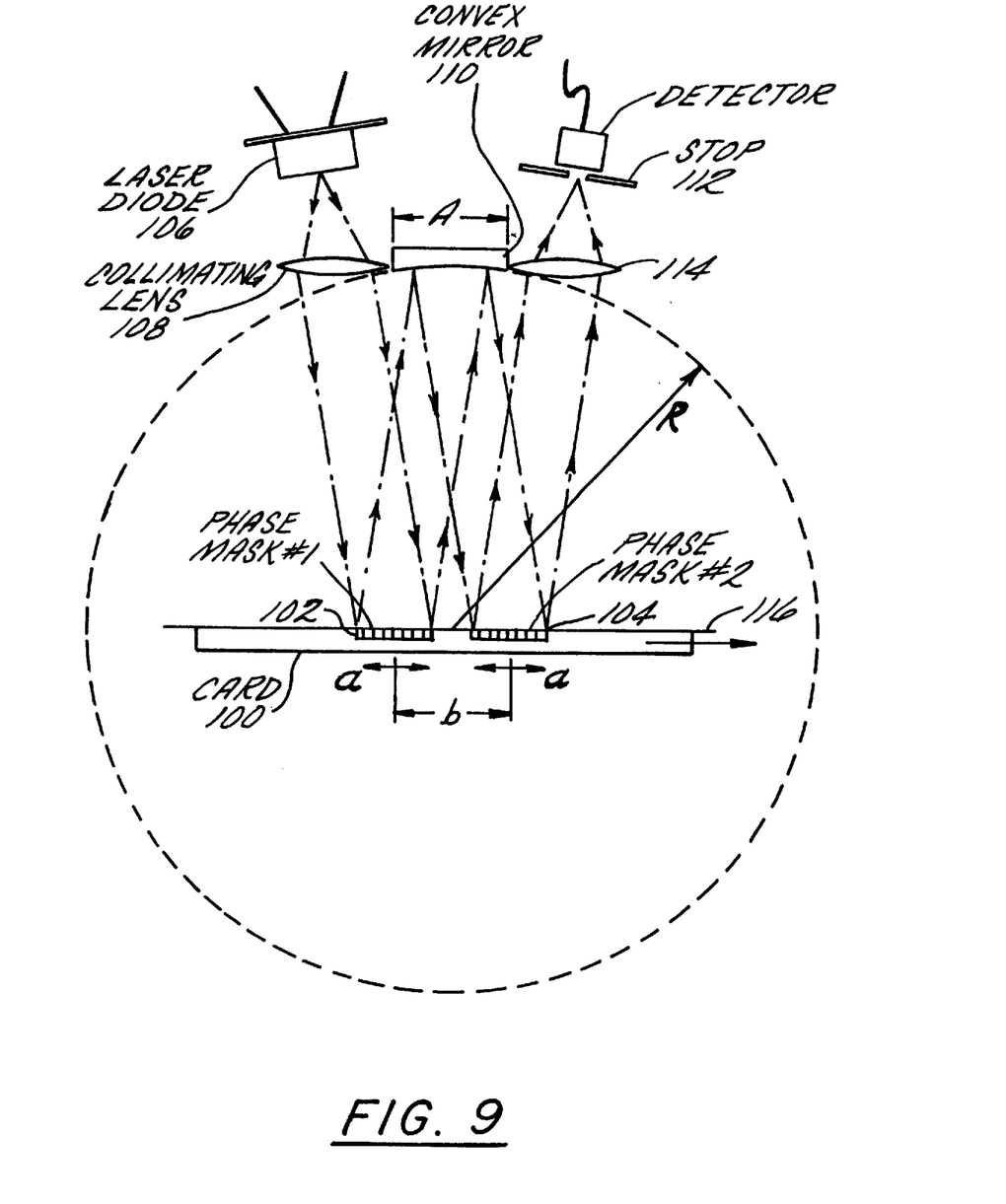
FIG. 9 is a diagrammatic view of an optical pattern recognition system in accordance with an alternate embodiment of the embodiment of FIG. 8.

Referring now to FIG. 9, an alternate embodiment of the embodiment of FIG. 8 is shown, wherein the above identified problem is resolved. It will be appreciated that such applies to masks having one dimensional or two dimensional functions, such as described herein. A card 100 has an input mask 102 and a reference mask 104 affixed thereto, in other words the reference mask is no longer fixed to the system. A light source 106 generates a generally coherent light beam, which is directed at mask 102 through a collimating lens 108. Input mask 102 reflects the beam back towards a convex mirror 110 which then directs the beam towards reference mask 104, whereby the light reflected from reference mask 104 if the product of the input and reference masks. This resulting correlation beam or image is focused on a detector 112 by lens 114. The degree of correlation is determined and verification is made in the same manner described above with reference to the FIG. 8 embodiment.

The distance between a guiding plate 116 and the spherical mirror 110 is important and must be maintained. By way of example in the correlator of FIG. 9 with 20 $\mu$m pixels sizes, and 100×100 pixels per phase mask, each phase mask is only 2 mm×2 mm. Since the space-band-width product of the system does not need to be much larger than 100×100 (or $10^4$), a usable system is one where the concave mirror has an aperture of 3 mm, and a focal length of 5 mm.

With both the input mask and the reference mask on the card, alignment problems have been transferred from the system to card fabrication. This is believed to be more economical, since alignment will likely be done less frequently in fabrication than in the system. In this embodiment, with the credit card example, each company can now have a different reference mask without further complicating the system ad described above. Accordingly, the system can be used with cards from different companies, each having its own pattern on the reference mask.

The time dependent function will be matched electronically to either the card number, or codes obtained, through the phone lines, from the data base of the credit card companies. The algorithms employed by different companies are anticipated to be different and can be kept as company secrets.

This system is at least as secure as the one shown in FIG. 8. The security is based on the fact that each card has a unique pair of patterns and verification is achieved by algorithmically processing a time varying function. Both patterns residing on a single card does not compromise the protection provided by the system. If a card with two patterns can be copied, so can a card with one pattern. Therefore, the protection of a two-pattern card system and a one-pattern card/one-pattern reader system is about the same.

The algorithm that is used to generate the patterns must not be computationally intensive so that the average computation time per card is low. If the converse it true, not only will the time taken to replace existing cards be lengthy, the average production cost will also be unacceptable. For example, if it takes one minute to compute one set of patterns, the total time required for 600,000,000 cards is over 1,000 years.

On the other hand, if the algorithm is straightforward, forgers may break it with ease. The encryption industry overcomes this problem by employing non-reversible algorithms characterized by non-linear processes, such is employed here.

A complex seed pattern, S(x, y) is first created from a random number generator. A number of randomly shifted S(x, y)'s are then summed to produce a pattern N(x, y). Only the phase of N(x, y) is then preserved to produce N(x, y). M(x, y) is generated in the same manner. Since N(x, y) and M(x, y) are generated from the same seed S(x, y), their correlation will have some well defined peaks. It will be appreciated, that if N(x, y) and M(x, y) are two totally random signals, their correlation will not have any ordered structure.

The correlation R(x, y) can be stored in the magnetic strip on the card or in the computerized database of the credit card companies. When a card is inserted into the system (i.e., a card reader), the output of the correlation is compared with the stored R(x, y) to determine the authenticity of the card. Since the phase only operation is very non-linear, it is very difficult to figure out N(x, y) and M(x, y) from R(x, y).

The patterns N(x, y) and M(x, y) are chosen by the computers of credit card companies. The patterns can be encrypted before they are sent to a remote manufacturing site. The patterns are then deciphered and fed to a character printer. The character printer may reside inside a vault with access only to authorized personnel, whereby two narrow slots on the sides allows a conveying belt to transfer credit cards in and out of the vault. This will assure that sufficient security can be maintained at the manufacturing site.

Security protection can be further increased if the wavelength of the recording laser diode 106 is selected at random for different cards. The wavelength selection is achieved through the tuning of the external cavity. Without knowledge of the exact wavelength used for recording, direct copying of the patterns from genuine credit cards will be very difficult (even after forgers have defeated all other counter-copying measures). This is because if the wrong wavelength is used to copy the holograms, the bragg matching conditions will be different. This means that the reconstructions of N(x, y) will be weaker and emerge at angles different from the proper propagation direction. This in turn will reconstruct even weaker M(x, y) which will propagate with even larger deviations. The resultant correlations will be very weak and will partially (if not completely) miss the detector 112. Since it will not be obvious from the card reader that the wavelength of operation varies for different cards (no tuner is need for readout), forgers may not even know how to counterfeit. Additional protection (for truly high security systems) can be achieved by multiplexing several holograms on the same spot. Each multiplexed hologram will be written at a different wavelength. The correct output is the sum of all correlations. Many other multiplexing methods can be adopted to further increase the complexity of the identity patterns. These measures can be easily implemented by the system shown in FIG. 9 with very little additional cost.

Figure 10:
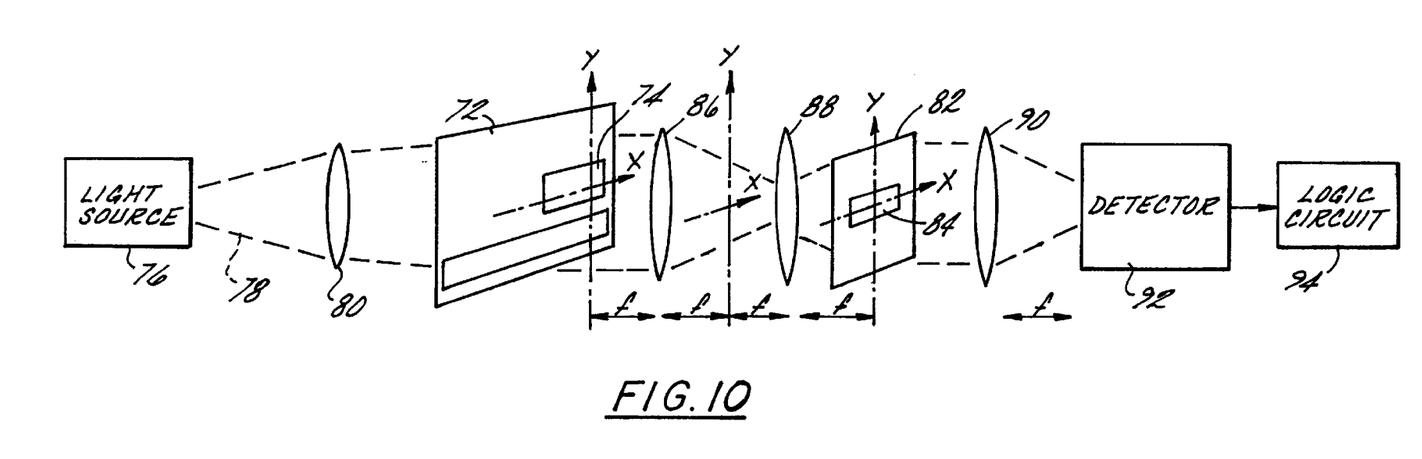
FIG. 10 is a diagrammatic view of an optical pattern recognition system in accordance with a fourth embodiment of the present invention.

Referring to FIG. 10, yet another alternate embodiment of the embodiment shown in FIG. 2 is shown. It will be appreciated that such also applies to masks having one dimensional functions, such as described above with regard to FIG. 1. A card 72 has an input mask 74, having a two dimensional random function N(x,y), affixed thereto. A light source 76 (e.g., a laser diode) generates a generally coherent light beam 78 which is expanded by a lens 80 for illuminating input mask 74 by transmitting the light beam through a transparent portion of card 72 (or by reflection), when the card is disposed within the light path (i.e., beam 78). A reference mask 84, with a two dimensional function M*(x, y), herein * is complex conjugation, is positioned in the output (image) plane of the 4F lens systems, as is well known in the art, e.g., see "Introduction to Fournier Optics", by J. W. Goodman, McGraw-Hill, 1968 and "Optical Signal Processing", by J. L. Horner, Academic Press, 1987, both of which are incorporated herein by reference. The image of input mask 74 is double Fourier transformed by lenses 86 and 88 which function as an imaging system. The image of the mask 74 is multiplied with the signal of mask 84 and the lens 90 produces in the Fourier plane a correlation spot at the input plane of a detector 92.

When the degree of correlation between N(x,y) and M(x,y) is high, a high intensity spot (i.e., a Dirac delta function) will be detected by detector 92 and if the intensity thereof exceeds a predetermined level, a logic circuit 94 by comparing this correlated signal with the threshold will produce an authenticity verification signal at its output. If the input mask 74 is a counterfeit, the intensity of the correlation spot will be far below the threshold and logic circuit 94 will not produce an authenticity verification signal. Again, the nature of this frequency plane correlator is well know in the art.

It is preferred in this embodiment that two-dimensional complex phase/amplitude patterns are utilized for verification of the authenticity of items bearing the pattern. However, two-dimensional phase patterns may also be utilized for verification of the authenticity of items bearing the pattern.

The scanning of the input mask over the reference mask can be accomplished in a number of ways. It can be accomplished mechanically by a clerk manually shifting the input mask on the credit card over the reference mask. Currently, credit cards are slid through a reader to obtain the codes on the magnetic strip. Or, the card can be placed on a motorized scanner that will scan the input mask over the reference mask. A number of other obvious methods of scanning such as a vibrating mirror is also possible.

Thus, the input mask can also be described as a seal for verifying the authenticity of an object to which the seal is applied. Of course, this does not guard against stolen cards, and a user personal identification number (PIN) could still be encoded somewhere on the card. Also, a fingerprint or photograph of the person's face could be put on the card to verify the user. For complete security, both the phase mask and the personal identification means suggested above would be included.

In some applications it may be desirable to write the input pattern on materials with limited life or decay time so that the input pattern would disappear in a specific length of time. This could be useful for products that should be sold by a given date and would guard against theft. For example, a liquid crystal material operates by an electric field applied to the crystal. If the field is stored on a capacitor connected to a shunt resistor, the lifetime of the pattern written on the crystal would depend on the time constant of the RC circuit. Adjusting the resistance could vary the decay time of the pattern stored on the crystal. This could have such applications to such things as medical supplies and food items. In other words, this embodiment makes it possible to accurately verify the authenticity of shelf-life of a product. A different version of this idea is a leaky mirror placed behind the phase mask operating in reflective mode. The leakage could increase with time to the point that after a given length of time, the mirror either completely absorbs the light or becomes transmissive.

Masks herein can be fabricated by a variety of materials and techniques, such as photopolymers, photorefractive materials, embossing techniques and diffractive optics, as are known. Masks can be written onto a, so called, "thick" optical material. A thick optical material has a thickness which is at least several times the wavelength of the light used to write the pattern onto the material, e.g., similar to volume holigraphy. See generally, "Fundamentals of Photonics, by B. B. A. Saleh and M. Teich Wiley, 1992 and Introduction to Fourier Optics, by J. W. Goodman, McGraw Hill, 1968, both of which are incorporated herein by reference. Writing the mask onto a thick optical material provides an additional security, in that during verification (reading) of the mask the Bragg condition must be satisfied. In this case only partially coherent light is required to read the mask.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of verifying the authenticity of an object, the method comprising the steps of:

associating an input mask with the object. said input mask including a two dimensional function N(x,y);

scanning in one dimension said input mask with a light source to generate an input image;

projecting said input image at a reference mask in the spatial domain to generate a spatially integrated correlation image, said reference mask includes a two dimensional function $M_{SDF}$ (x,y) which includes possible shifts in the y-direction and is defined by, $$M_{SDF}(x,y) = \sum_{i=1}^{m_0} M(x, y - i)$$

where $m_0$ is the severity of misalignment in a y-direction for a system designed to detect a two dimensional function M(x,y) by one dimensional correlation, and said correlation image has a function defined by, $$\hat{R}(x',y_0) = \iint N(x-x', y-y_0) M_{SDF}(x,y) dx dy;$$

detecting said correlation image to provide a correlation signal indicative of said correlation image; and comparing said correlation signal to at least one threshold level to verify to the authenticity of the object.

2. The method of claim 1 wherein said step of detecting said correlation image comprises detecting the intensity of said correlation image.

3. The method of claim 1 wherein said step of associating said input mask with the object comprises affixing said input mask to the object.

4. The method of claim 1 wherein said object is a card.

5. The method of claim 1 further comprising the step of: associating said reference mask with the object.

6. The method of claim 4 further comprising the steps of: affixing said input mask the card; and affixing said reference mask to the card.

7. The method of claim 1 wherein:

said input mask includes a complex phase/amplitude pattern; and said reference mask includes a complex phase/amplitude pattern.

8. The method of claim 1 wherein:

said input mask includes a phase pattern; and said reference mask includes a phase pattern.

9. A method of verifying the authenticity of an object, the method comprising the steps of:

associating an input mask with the object, said input mask includes a two dimensional function N(x,y);

providing a spatial integrating optical correlator having an input plane and an output plane;

scanning in one dimension said input mask with a light source to generate an input image at said input plane of said correlator;

projecting said input image at a reference mask in the spatial domain to generate a spatially integrated correlation image at said output plane of said correlator, said reference mask includes a two dimensional function $M_{SDF}$ (x,y) which includes possible shifts in the y-direction and is defined by, $$M_{SDF}(x,y) = \sum_{i=1}^{m_0} M(x, y - i)$$

where $m_0$ is the severity of misalignment in a y-direction for a system designed to detect a two dimensional function M(x,y) by one dimensional correlation;

said correlation image has a function defined by, $$\hat{R}(x',y_0) = \iint N(x-x', y-y_0) M_{SDF}(x,y) dx dy;$$

detecting said correlation image to provide a correlation signal indicative of said correlation image; and comparing said correlation signal to at least one threshold level to verify to the authenticity of the object.

10. The method of claim 9 wherein said step of detecting said correlation image comprises detecting the intensity of said correlation image.

11. The method of claim 9 wherein said step of associating said input mask with the object comprises:

affixing said input mask to the object.

12. The method of claim 9 wherein said object is a card.

13. The method of claim 9 further comprising the step of: associating said reference mask with the object.

14. The method of claim 12 further comprising the steps of:

affixing said input mask the card; and affixing said reference mask to the card.

15. The method of claim 9 wherein:

said input mask includes a complex phase/amplitude pattern; and said reference mask includes a complex phase/amplitude pattern.

16. The method of claim 9 wherein:

said input mask includes a phase pattern; and said reference mask includes a phase pattern.

17. An apparatus for verifying the authenticity of an object having an input mask coupled thereto, comprising:

a partially coherent light source;

means for scanning in one dimension said input mask with said light source to generate an input image, said input mask includes a two dimensional function N(x,y);

a reference mask including a two dimensional function $M_{SDF}$ (x,y) which includes possible shifts in the y-direction and is defined by, $$M_{SDF}(x,y) = \sum_{i=1}^{m_0} M(x, y - i)$$

where $m_0$ is the severity of misalignment in a y-direction for a system designed to detect a two dimensional function M(x,y) by one dimensional correlation;

means for projecting said input image at said reference mask in the spatial domain to generate a spatially integrated correlation image having a function defined by, $$\hat{R}(x',y_0) = \iint N(x-x', y-y_0) M_{SDF}(x,y) dx dy;$$

means for detecting said correlation image to provide a correlation signal indicative of said correlation image; and means for comparing said correlation signal to a threshold level to verify to the authenticity of the object.

18. The apparatus of claim 17 wherein said means for detecting comprises means for detecting the intensity of said correlation image.

19. The apparatus of claim 17 wherein said object comprises a card having said input mask affixed thereto.

20. The apparatus of claim 17 wherein said object comprises a card having said input mask and said reference mask affixed thereto.

21. The apparatus of claim 17 wherein:
said input mask includes a complex phase/amplitude pattern; and
said reference mask includes a complex phase/amplitude pattern.

22. The apparatus of claim 17 wherein:
said input mask includes a phase pattern; and
said reference mask includes a phase pattern.

23. An apparatus for verifying the authenticity of an object having an input mask coupled thereto, comprising:
a partially coherent light source;
a spatial integrating optical correlator having an input plane and an output plane;
means for scanning in one dimension said input mask with said light source to generate an input image at said input plane of said correlator, said input mask includes a two dimensional function N(x,y);
a reference mask including a two dimensional function $M_{SDF}(x,y)$ which includes possible shifts in the v-direction and is defined by, $$M_{SDF}(x,y) = \sum_{i=1}^{m_0} M(x, y-i)$$

where $m_0$ is the severity of misalignment in a y-direction for a system designed to detect a two dimensional function M(x,y) by one dimensional correlation;
means for projecting said input image at said reference mask in the spatial domain to generate a spatially integrated correlation image at said output plane of said correlator, said correlation image has a function defined by, $$\hat{R}(x',y_0) = \iint N(x-x', y-y_0) M_{SDF}(x,y) dx dy;$$

means for detecting said correlation image to provide a correlation signal indicative of said correlation image; and
means for comparing said correlation signal to at least one threshold level to verify to the authenticity of the object.

24. The apparatus of claim 23 wherein said means for detecting comprises means for detecting the intensity of said correlation image.

25. The apparatus of claim 23 wherein said object comprises a card having said input mask affixed thereto.

26. The apparatus of claim 23 wherein said object comprises a card having said input mask and said reference mask affixed thereto.

27. The apparatus of claim 23 wherein:
said input mask includes a complex phase/amplitude pattern; and
said reference mask includes a complex phase/amplitude pattern.

28. The apparatus of claim 23 wherein:
said input mask includes a phase pattern; and
said reference mask includes a phase pattern.

29. A method of verifying the authenticity of an object, the method comprising the steps of:
converting a biometric signature into a first mask including a one dimensional function f(x);
bonding a second mask to said first mask to form an input mask, wherein said input mask is a composite mask, said second mask including a one dimensional function M(x), said one dimensional function M(x) is defined by, $$M(x) = e^{i\phi_m(x)}$$

where $\phi m(x)$ is a random function, whereby said composite mask includes a one dimensional function g(x), said function g(x) being defined by, $$g(x) = f(x) M(x);$$

associating said input mask with the object;
scanning in one dimension said input mask with a light source to generate an input image;
projecting said input image at a reference mask in the spatial domain to generate a spatially integrated correlation image, said reference mask including a one dimensional function M*(x), where * is the complex conjugate, and said correlation image has a function R(x) defined by, $$R(x) = \int M^*(x-x') g(x) dx;$$

detecting said correlation image to provide a correlation signal indicative of said correlation image; and
comparing said correlation signal to at least one threshold level to verify to the authenticity of the object.

30. The method of claim 29 wherein said step of detecting said correlation image comprises detecting the intensity of said correlation image.

31. The method of claim 29 wherein said step of associating said input mask with the object comprises:
affixing said input mask to the object.

32. The method of claim 29 wherein said object is a card.

33. The method of claim 29 further comprising the step of:
associating said reference mask with the object.

34. The method of claim 32 further comprising the steps of:
affixing said input mask the card; and
affixing said reference mask to the card.

35. The method of claim 29 wherein said object is a card; and the method further comprising the steps of:
affixing said composite mask the card; and
affixing said reference mask to the card.

36. The method of claim 29 wherein:
said first mask includes a complex phase/amplitude pattern;
said second mask includes a complex phase/amplitude pattern;
whereby said composite mask includes a complex phase/amplitude pattern; and
said reference mask includes a complex phase/amplitude pattern.

37. The method of claim 29 wherein:
said first mask includes a phase pattern;

said second mask includes a phase pattern;
whereby said composite mask includes a phase pattern; and
said reference mask includes a phase pattern.

38. A method of verifying the authenticity of an object, the method comprising the steps of:
   converting a biometric signature into a first mask including a one dimensional function f(x); and
   bonding a second mask to said first mask to form an input mask, wherein said input mask is a composite mask, said second mask including a one dimensional function M(x), said one dimensional function M(x) is defined by, $$M(x)=e^{i\phi_m(x)}$$

where $\phi_m(x)$ is a random function, whereby said composite mask includes a one dimensional function g(x), said function g(x) being defined by, $$g(x)=f(x)M(x);$$

associating an input mask with the object;
   providing a spatial integrating optical correlator having an input plane and an output plane;
   scanning in one dimension said input mask with a light source to generate an input image at said input plane of said correlator;
   projecting said input image at a reference mask in the spatial domain to generate a spatially integrated correlation image at said output plane of said correlator, said reference mask includes a one dimensional function M*(x), where * is the complex conjugate, and said correlation image has a function R(x) defined by, $$R(x)=\int M^*(x-x')g(x)dx;$$

detecting said correlation image to provide a correlation signal indicative of said correlation image; and
   comparing said correlation signal to at least one threshold level to verify to the authenticity of the object.

39. The method of claim 38 wherein said step of detecting said correlation image comprises detecting the intensity of said correlation image.

40. The method of claim 38 wherein said step of associating said input mask with the object comprises:
   affixing said input mask to the object.

41. The method of claim 38 wherein said object is a card.

42. The method of claim 38 further comprising the step of:
   associating said reference mask with the object.

43. The method of claim 41 further comprising the steps of:
   affixing said input mask the card; and
   affixing said reference mask to the card.

44. The method of claim 38 wherein said object is a card; and the method further comprising the steps of:
   affixing said composite mask the card; and
   affixing said reference mask to the card.

45. The method of claim 38 wherein;
   said first mask includes a complex phase/amplitude pattern;
   said second mask includes a complex phase/amplitude pattern;
   whereby said composite mask includes a complex phase/amplitude pattern; and said reference mask includes a complex phase/amplitude pattern.

46. The method of claim 38 wherein:
   said first mask includes a phase pattern;
   said second mask includes a phase pattern;
   whereby said composite mask includes a phase pattern; and
   said reference mask includes a phase pattern.

47. An apparatus for verifying the authenticity of an object comprising:
   a first mask including a biometric signature, said first mask including a one dimensional function f(x);
   a second mask bonded to said first mask to form an input mask, wherein said input mask is a composite mask and is associated with the object, said second mask including a one dimensional function M(x), said one dimensional function M(x) is defined by, $$M(x)=e^{i\phi_m(x)}$$

where $\phi_m(x)$ is a random function, whereby said composite mask includes a one dimensional function g(x), said function g(x) being defined by, $$g(x)=f(x)M(x);$$

a partially coherent light source;
   means for scanning in one dimension said input mask with said light source to generate an input image;
   a reference mask including a one dimensional function M*(x), where * is the complex conjugate;
   means for projecting said input image at said reference mask in the spatial domain to generate a spatially integrated correlation image, said correlation image has a function R(x) defined by, $$R(x)=\int M^*(x-x')g(x)dx;$$

means for detecting said correlation image to provide a correlation signal indicative of said correlation image; and
   means for comparing said correlation signal to a threshold level to verify to the authenticity of the object.

48. The apparatus of claim 47 wherein said reference mask comprises a reference pattern stored in a thick optical material, the thickness of said optical material being at least several times the wavelength of light from which said reference pattern was written.

49. The apparatus of claim 47 wherein said means for detecting comprises means for detecting the intensity of said correlation image.

50. The apparatus of claim 47 wherein said object comprises a card having said input mask affixed thereto.

51. The apparatus of claim 47 wherein said object comprises a card having said input mask and said reference mask affixed thereto.

52. The apparatus of claim 47 wherein said object comprises a card having said composite mask and said reference mask affixed thereto.

53. The apparatus of claim 47 wherein:
   said first mask includes a complex phase/amplitude pattern;
   said second mask includes a complex phase/amplitude pattern;
   whereby said composite mask includes a complex phase/amplitude pattern; and said reference mask includes a complex phase/amplitude pattern.

54. The apparatus of claim 47 wherein:

said first mask includes a phase pattern;

said second mask includes a phase pattern;

whereby said composite mask includes a phase pattern; and said reference mask includes a phase pattern.

55. An apparatus for verifying the authenticity of an object comprising:

a first mask including a biometric signature, said first mask including a one dimensional function f(x);

a second mask bonded to said first mask to form said input mask, wherein said input mask is a composite mask and is associated with the object, said second mask includes a one dimensional function M(x), said one dimensional function M(x) is defined by, $$M(x)=e^{i\phi_m(x)}$$

where $\phi_m(x)$ is a random function, whereby said composite mask includes a one dimensional function g(x), said function g(x) being defined by, $$g(x)=f(x)M(x);$$

a partially coherent light source;

a spatial integrating optical correlator having an input plane and an output plane;

means for scanning in one dimension said input mask with said light source to generate an input image at said input plane of said correlator;

a reference mask including a one dimensional function M*(x), where * is the complex conjugate;

means for projecting said input image at said reference mask in the spatial domain to generate a spatially integrated correlation image at said output plane of said correlator, said correlation image has a function R(x) defined by, $$R(x)=\int M^*(x-x')g(x)dx;$$

means for detecting said correlation image to provide a correlation signal indicative of said correlation image; and means for comparing said correlation signal to at least one threshold level to verify to the authenticity of the object.

56. The apparatus of claim 55 wherein said means for detecting comprises means for detecting the intensity of said correlation image.

57. The apparatus of claim 55 wherein said object comprises a card having said input mask affixed thereto.

58. The apparatus of claim 55 wherein said object comprises a card having said input mask and said reference mask affixed thereto.

59. The apparatus of claim 55 wherein said object comprises a card having said composite mask and said reference mask affixed thereto.

60. The apparatus of claim 55 wherein:

said first mask includes a complex phase/amplitude pattern;

said second mask includes a complex phase/amplitude pattern;

whereby said composite mask includes a complex phase/amplitude pattern; and said reference mask includes a complex phase/amplitude pattern.

61. The apparatus of claim 55 wherein:

said first mask includes a phase pattern;

said second mask includes a phase pattern;

whereby said composite mask includes a phase pattern; and said reference mask includes a phase pattern.

62. A method of verifying the authenticity of an object, the method comprising the steps of:

converting a biometric signature into a first mask, said first mask includes a two dimensional function f(x,y);

bonding a second mask to said first mask to form an input mask, wherein said input mask is a composite mask, said second mask includes a two dimensional function M(x,y), said two dimensional function M(x,y) is defined by, $$M(x,y)=e^{i\phi_m(x,y)}$$

where $\phi_m(x,y)$ is a random function, whereby said composite mask includes a two dimensional function g(x,y), said function g(x,y) being defined by, $$g(x,y)=f(x,y)M(x,y);$$

associating said input mask with the object;

scanning in one dimension said input mask with a light source to generate an input mask image;

projecting said input image at a reference mask in the spatial domain to generate a spatially integrated correlation image, said reference mask includes a two dimensional function M*(x,y), where * is the complex conjugate, and said correlation image has a function R(x,y) defined by, $$R(x,y)=\iint M^*(x-x',y-y')g(x,y)dxdy;$$

detecting said correlation image to provide a correlation signal indicative of said correlation image; and comparing said correlation signal to at least one threshold level to verify to the authenticity of the object.

63. The method of claim 62 wherein said step of detecting said correlation image comprises detecting the intensity of said correlation image.

64. The method of claim 62 wherein said step of associating said input mask with the object comprises:

affixing said input mask to the object.

65. The method of claim 62 wherein said object is a card.

66. The method of claims 62 further comprising the step of:

associating said reference mask with the object.

67. The method of claim 65 further comprising the steps of:

affixing said input mask the card; and affixing said reference mask to the card.

68. The method of claim 62 wherein said object is a card; and the method further comprising the steps of:

affixing said composite mask the card; and affixing said reference mask to the card.

69. The method of claim 62 wherein:

said first mask includes a complex phase/amplitude pattern;

said second mask includes a complex phase/amplitude pattern;

whereby said composite mask includes a complex phase/amplitude pattern; and said reference mask includes a complex phase/amplitude pattern.

70. The method of claim 62 wherein:

said first mask includes a phase pattern;

said second mask includes a phase pattern;

whereby said composite mask includes a phase pattern; and said reference mask includes a phase pattern.

71. A method of verifying the authenticity of an object, the method comprising the steps of:

converting a biometric signature into a first mask, said first mask including a two dimensional function f(x,y);

bonding a second mask to said first mask to form input mask, wherein said input mask is a composite mask, said second mask includes a two dimensional function M(x,y), said two dimensional function M(x,y) is defined by, $$M(x,y)=e^{i\phi_m(x,y)}$$

where $\phi_m(x,y)$ is a random function, whereby said composite mask includes a two dimensional function g(x,y), said function g(x,y) being defined by, $$g(x,y)=f(x,y)M(x,y);$$

associating an input mask with the object;

providing a spatial integrating optical correlator having an input plane and an output plane;

scanning in one dimension said input mask with a light source to generate an input image at said input plane of said correlator, projecting said input image at a reference mask in the spatial domain to generate a spatially integrated correlation image at said output plane of said correlator, said reference mask includes a two dimensional function M*(x,y), where * is the complex conjugate, and said correlation image has a function R(x,y) defined by, $$R(x,y)=\iint M^*(x-x',y-y')g(x,y)dxdy;$$

detecting said correlation image to provide a correlation signal indicative of said correlation image; and comparing said correlation signal to at least one threshold level to verify to the authenticity of the object.

72. The method of claim 71 wherein said step of detecting said correlation image comprises detecting the intensity of said correlation image.

73. The method of claim 71 wherein said step of associating said input mask with the object comprises:

affixing said input mask to the object.

74. The method of claim 71 wherein said object is a card.

75. The method of claim 71 further comprising the step of:

associating said reference mask with the object.

76. The method of claim 74 further comprising the steps of:

affixing said input mask the card; and affixing said reference mask to the card.

77. The method of claim 71 wherein said object is a card; and the method further comprising the steps of:

affixing said composite mask to the card; and affixing said reference mask to the card.

78. The method of claim 71 wherein:

said first mask includes a complex phase/amplitude pattern;

said second mask includes a complex phase/amplitude pattern;

whereby said composite mask includes a complex phase/amplitude pattern; and said reference mask includes a complex phase/amplitude pattern.

79. The method of claim 71 wherein:

said first mask includes a phase pattern;

said second mask includes a phase pattern;

whereby said composite mask includes phase pattern; and said reference mask includes a phase pattern.

80. An apparatus for verifying the authenticity of an object comprising:

a first mask including a biometric signature, said first mask includes a two dimensional function f(x,y);

a second mask bonded to said first mask to form an input mask, wherein said input mask is a composite mask and is associated with the object, said second mask includes a two dimensional function M(x,y), said two dimensional function M(x,y) is defined by, $$M(x,y)=e^{i\phi_m(x,y)}$$

where $\phi_m(x,y)$ is a random function, whereby said composite mask includes a two dimensional function g(x,y), said function g(x,y) being defined by, $$g(x,y)=f(x,y)M(x,y);$$

a partially coherent light source;

means for scanning in one dimension said input mask with said light source to generate an input image;

a reference mask including a two dimensional function M*(x,y) where * is the complex conjugate;

means for projecting said input image at said reference mask in the spatial domain to generate a spatially integrated correlation image, said correlation image has a function R(x,y) defined by, $$R(x,y)=\iint M^*(x-x',y-y')g(x,y)dxdy;$$

means for detecting said correlation image to provide a correlation signal indicative of said correlation image; and means for comparing said correlation signal to a threshold level to verify to the authenticity of the object.

81. The apparatus of claim 80 wherein said reference mask comprises a reference pattern stored in a thick optical material, the thickness of said optical material being at least several times the wavelength of light from which said reference pattern was written.

82. The apparatus of claim 80 wherein said object comprises a card having said input mask affixed thereto.

83. The apparatus of claim 80 wherein said object comprises a card having said input mask and said reference mask affixed thereto.

84. The apparatus of claim 80 wherein said object comprises a card having said composite mask and said reference mask affixed thereto.

85. The apparatus of claim 80 wherein:

said first mask includes a complex phase/amplitude pattern;

said second mask includes a complex phase/amplitude pattern;

whereby said composite mask includes a complex phase/ amplitude pattern; and said reference mask includes a complex phase/amplitude pattern.

86. The apparatus of claim 80 wherein:

said first mask includes a phase pattern;

said second mask includes a phase pattern;

whereby said composite mask includes a phase pattern; and said reference mask includes a phase pattern.

87. An apparatus for verifying the authenticity of an object comprising:

a first mask including a biometric signature, said first mask including a two dimensional function f(x,y);

a second mask bonded to said first mask to form an input mask, wherein said input mask is a composite mask and is associated with the object, said second mask includes a two dimensional function M(x,y), said two dimensional function M(x,y) is defined by, $$M(x,y)=e^{i\phi_m(x,y)}$$

where $\phi_m(x,y)$ is a random function, whereby said composite mask includes a two dimensional function g(x,y), said function g(x,y) being defined by, $$g(x,y)=f(x,y)M(x,y);$$

a partially coherent light source;

a spatial integrating optical correlator having an input plane and an output plane;

means for scanning in one dimension said input mask with said light source to generate an input image at said input plane of said correlator;

a reference mask including a two dimensional function M*(x,y), where * is the complex conjugate, means for projecting said input image at said reference mask in the spatial domain to generate a spatially integrated correlation image at said output plane of said correlator, said correlation image has a function R(x,y) defined by, $$R(x,y)=\iint M^*(x-x',y-y')g(x,y)dxdy;$$

means for detecting said correlation image to provide a correlation signal indicative of said correlation image; and means for comparing said correlation signal to at least one threshold level to verify to the authenticity of the object.

88. The apparatus of claim 87 wherein said means for detecting comprises means for detecting the intensity of said correlation image.

89. The apparatus of claim 87 wherein said object comprises a card having said input mask affixed thereto.

90. The apparatus of claim 87 wherein said object comprises a card having said input mask and said reference mask affixed thereto.

91. The apparatus of claim 87 wherein said object comprises a card having said composite mask and said reference mask affixed thereto.

92. The apparatus of claim 87 wherein:

said first mask includes a complex phase/amplitude pattern;

said second mask includes a complex phase/amplitude pattern;

whereby said composite mask includes a complex phase/ amplitude pattern; and said reference mask includes a complex phase/amplitude pattern.

93. The apparatus of claim 87 wherein:

said first mask includes a phase pattern;

said second mask includes a phase pattern;

whereby said composite mask includes a phase pattern; and said reference mask includes a phase pattern.

* * * * *